(12) United States Patent
Vollum

(10) Patent No.: US 7,212,942 B2
(45) Date of Patent: May 1, 2007

(54) POWER AVAILABLE AND LIMITATION INDICATOR FOR USE WITH AN AIRCRAFT ENGINE

(75) Inventor: Stephen H. Vollum, Hillsboro, OR (US)

(73) Assignee: Precision Innovations LLC, Hillsboro, OR (US)

( * ) Notice: Subject to any disclaimer, the term of this patent is extended or adjusted under 35 U.S.C. 154(b) by 427 days.

(21) Appl. No.: 10/459,114

(22) Filed: Jun. 10, 2003

(65) Prior Publication Data

US 2004/0254747 A1 Dec. 16, 2004

(51) Int. Cl.
*G01D 1/00* (2006.01)

(52) U.S. Cl. ...................................... 702/127

(58) Field of Classification Search ................ 702/44, 702/60, 61, 127, 57; 701/3, 4, 14, 9, 99–102; 340/945, 946, 956, 959, 963, 971, 973, 980; 73/178 H
See application file for complete search history.

(56) References Cited

U.S. PATENT DOCUMENTS

| | | | |
|---|---|---|---|
| 3,754,440 A * | 8/1973 | Edgerton et al. | ......... 73/178 H |
| 3,927,307 A | 12/1975 | Reschak | |
| 4,034,605 A | 7/1977 | Green | |
| 4,114,843 A | 9/1978 | Robinson | |
| 4,131,391 A | 12/1978 | Robinson | |
| 4,223,429 A | 9/1980 | Robinson | |
| 4,236,212 A | 11/1980 | Arents | |
| 4,449,703 A | 5/1984 | Robinson | |
| 4,736,331 A | 4/1988 | Lappos et al. | |
| 4,780,838 A * | 10/1988 | Adelson | ...................... 702/174 |
| 5,050,081 A * | 9/1991 | Abbott et al. | .................. 701/14 |
| 5,150,117 A | 9/1992 | Hamilton et al. | |
| 5,886,649 A | 3/1999 | Francois | |
| 5,908,485 A | 6/1999 | Germanetti | |
| 5,915,273 A * | 6/1999 | Germanetti | ................ 73/178 H |
| 5,986,580 A * | 11/1999 | Permanne | .................... 340/946 |
| 6,195,598 B1 | 2/2001 | Bosqui et al. | |
| 6,411,869 B2 * | 6/2002 | Permanne | ....................... 701/3 |
| 6,486,799 B1 * | 11/2002 | Still et al. | .................... 340/974 |
| 2002/0072831 A1 | 6/2002 | Blondel et al. | |
| 2003/0229426 A1 * | 12/2003 | Griffin et al. | ................... 701/3 |
| 2004/0107040 A1 * | 6/2004 | Edwards, II et al. | ........ 701/110 |

FOREIGN PATENT DOCUMENTS

DE 3640452 6/1988 ................. 340/946

* cited by examiner

*Primary Examiner*—Michael Nghiem
*Assistant Examiner*—Demetrius Pretlow
(74) *Attorney, Agent, or Firm*—Stoel Rives LLP

(57) ABSTRACT

An instrument for use in a helicopter includes a performance calculator typically housed in a control unit (16) and a display unit (14). The system receives electronic indicia (44) of current altitude, air temperature, fuel on-board and engine manifold pressure, and calculates (in substantially real time) the following: (a) maximum amount of power the engine can produce at these conditions; (b) limitations set by the aircraft manufacturer on power that may be used; (c) maximum airspeed and hover weight allowed under these conditions; (d) percent power used (the "torque gauge"); and (e) amount of power remaining available. The power display unit has an arcuate series (24) of light elements fitted around the standard MP (20) gauge to provide graphic indicia (26, 28, 30) of power available for the pilot to easily see and interpret.

28 Claims, 5 Drawing Sheets

Figure 4 -- Software Flow Chart

| Step | | |
|---|---|---|
| 1 | read OAT | ("OAT" is outside air temperature) |
| 2 | read MP | ("MP is engine Manifold absolute Pressure) |
| 3 | read PALT | ("PALT" is pressure altitude) |
| 4 | read FOB | ("FOB" is US gallons of fuel on board) |
| 5 | T_STD | = 15.0 - PALT*0.019812 |
| 6 | D_ALT | = PALT + 118.6*T_STD |
| 7 | MC_PWR | = (lookup limit in table using OAT and PALT) |
| 8 | M5M_PWR | = (lookup limit in table using OAT and PALT) |
| 9 | MAX_PWR | = (lookup limit in table using OAT and PALT) |
| 10 | AVAIL_MP | = 29.92 - (PALT/1000) - 1.1 |
| 11 | PCT_PWR | = MP / (min(AVAIL_MP,M5M_PWR,MAX_PWR) |
| 12 | VNE | = (lookup limit in table using OAT and PALT) |
| 13 | Green_arc_Start | = MP |
| 14 | Green_arc_End | = min(AVAIL_MP,MC_PWR) |
| 15 | Yellow_arc_Start | =IF(AVAIL_MP< MC_PWR) THEN –none– ELSE min(AVAIL_MP,max(MP,MC_PWR)) |
| 16 | Yellow_arc_End | = IF (AVAIL_MP< MC_PWR) THEN –none– ELSE min(M5M_PWR,MAX_PWR,AVAIL_MP) |
| 17 | FUEL_WT_LB | = FOB * 5.7 |
| 18 | HIGE_LB | = (lookup limit in table using OAT and PALT) |
| 19 | HOGE_LB | = (lookup limit in table using OAT and PALT) |
| 20 | WT_EMPTY | = (retrieve value stored for empty weight of this aircraft) |
| 21 | WT_MAX_GROSS | = (retrieve limit weight from limitations table) |
| 22 | WT_USEFUL | = WT_MAX_GROSS - WT_EMPTY |
| 23 | WT_PAYLOAD | = WT_USEFUL - FUEL_WT_LB |
| 24 | send green arc to PALi display | |
| 25 | send yellow arc to PALi display | |
| 26 | send PCT_PWR to PALi display | |
| 27 | cycle value shown on CONTROL UNIT with each button push, as follows: (a) OAT (b) D_ALT (c) MC_PWR (d) FUEL_WT_LB (e) HIGE_WT_LB (f) HOGE_WT_LB (g) stopwarch timer (h) Flight timer | Note: after (h) is displayed, recycle back to (a) |

Steps 1 through 27 are repeated every 0.5 seconds to provide constantly updated 'real time' values.

POWER AVAILABLE AND LIMITATION INDICATOR FOR USE WITH AN AIRCRAFT ENGINE

COPYRIGHT NOTICE

© 2003 Precision Innovations, LLC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present invention relates to determining and displaying the power available for a piston powered aircraft engine.

BACKGROUND OF THE INVENTION

Helicopters are normally powered by either a piston driven engine or a turbine engine. Power limitations for turbine engines are a result of several factors. Those factors typically include the following: an internal turbine temperature limit; a rotation per minute (RPM) limit; and a torque limit. Because a turbine engine can compress more air to increase the available air density, power limitations typically depend on the physical factors listed above.

For example, a turbine engine can not exceed its internal turbine temperature limit without damaging the engine. A turbine engine also cannot exceed its RPM limit without damaging the engine. The turbine engine can also not exceed its torque limit without damaging other components in the aircrafts system, such as a gearbox connecting the engine to the rotors. In effect, one of the above limits will usually act as a true limit for the turbine driven helicopter engine's power because one of the limits will normally be exceeded before the others. Various attempts to convey these limits to a pilot are shown in the prior art.

However, for a helicopter using a piston driven engine the power available at a given time depends on the ambient air pressure that is available for mixing with engine fuel. The ambient air pressure varies as a function of the actual altitude of the helicopter and the ambient air temperature at that altitude. The actual altitude and ambient air temperature can be used to calculate a density altitude or equivalent altitude. Typically, the ambient air pressure will decrease by one inch of mercury per 1,000 feet of pressure altitude. For example, at an actual altitude of 2,800 feet with an ambient air temperature of 38 degrees centigrade, the density altitude would be approximately 6,186 feet, and the ambient air pressure would be approximately 27.2 inches of mercury.

At sea level the available atmospheric pressure is measured to be approximately 29.92 inches of mercury and will normally decrease by one inch of mercury for each additional 1000 feet of pressure altitude. At sea level, the atmospheric pressure results in a maximum power available to a helicopter employing a piston engine, i.e. 29.92 inches of mercury of available manifold pressure. However, the typical piston engine will have a manufacturer determined maximum pressure that is lower than that value. For example, a Robinson R44 helicopter engine, model O-540-F1B5 manufactured by Lycoming of Williamsport, Pa., typically has a maximum allowable manifold pressure of 26.3 inches of mercury, while an R22 helicopter engine model O-360 also manufactured by Lycoming has a maximum allowable manifold pressure of 25.9 inches of mercury. In this context, the maximum pressure is typically measured by a sensor attached to a manifold of the piston engine and is referred to as manifold pressure (MP). As engines have improved, and "de-rating" has become popular, the maximum manifold pressure limit has remained relatively constant or has even been reduced thus allowing aircraft manufacturers to increase the altitude up to which the maximum engine power will still be available. The highest altitude at which a piston aircraft engine can produce its maximum allowable power is called the "critical altitude." Above the critical altitude the ambient air pressure is insufficient for a normally aspirated (non-turbocharged) piston driven aircraft engine to generate the maximum power, as set by its manufacturer.

Typically, the manufacturer will set three power limits, as follows: a maximum continuous power; a five-minute maximum power; and an absolute maximum power. A helicopter requires the most power at take off and when hovering, and these activities will often require that the engine be operated in the five-minute maximum power range.

Existing attempts to show a pilot the above-described limits (e.g., colored arcs painted on the face of a Manifold Pressure (MP) gauge) are only valid for one set of predetermined external conditions (i.e. a selected altitude and a selected temperature). Static indicia of performance limits are only valid at those specific conditions. Given the broad range of altitude and temperatures that can be encountered by a piston powered aircraft, the colored arcs often provide false confidence that more power is available than current conditions dictate, or the colored arcs depict overly conservative usable power limits.

Known instruments provide no indication to the helicopter pilot of the maximum amount of power actually available at a given altitude and temperature. Manufacturers usually do not even provide a way to calculate how much power is actually available. Where the actual power available exceeds the existing indication of limits (e.g., the green colored arc painted on the manifold pressure gauge) there is no special problem; the pilot merely needs to be sure not to exceed the maximum power limit set by the manufacturer. However, safety problems can occur when the actual power available is less than the maximum power limitation because the pilot may be unaware that the aircraft can not produce the maximum power limitation. Below the critical altitude there is always more power available than the manufacturer set maximum power limit. However, above the critical altitude the power available will be below the manufacturers limit. A pilot flying above the critical altitude currently has no way of knowing how much power is actually available, except to understand that the maximum available will be less than the manufacturer maximum limit.

In the case where a pilot attempts to use power in excess of what is actually available, potential safety of flight issues arise. A helicopter engine in flight generally operates at a fixed RPM (e.g., 100%) and its power demand is varied by a "collective control." At a given set of conditions (altitude, temperature and collective pitch), a pilot has no good way of knowing whether further increases of collective pitch (hence asking the engine for more power) would exceed the MP (power) that is actually available. Exceeding available engine power causes reduced rotor RPM, which if not corrected by immediate pilot action results in "rotor stall" with often catastrophic results. Rotor stall often occurs in conjunction with high altitude takeoffs and hovering in flight.

The need remains for an indicator that determines and conveys to a pilot a reliable indication of the actual power available during flight, especially when the aircraft is above its critical altitude.

SUMMARY OF THE INVENTION

The present invention pertains to a helicopter instrument that, in a presently preferred embodiment, comprises a performance calculator and associated display unit. The instrument receives several external inputs (i.e. altitude, outside air temperature, fuel quantity on board the aircraft and engine manifold pressure) and performs calculations based upon those inputs, in conjunction with engine performance tables (data) supplied by the engine manufacturer to determine one or more of the following values: (1) the maximum amount of power the engine is actually capable of producing at current conditions (the power available), (2) the limitations set by the aircraft manufacturer on the power settings that are allowed to be used under these conditions (the limitations), (3) the percent of power used, based on engine manifold pressure and (4) the maximum amount of weight that the helicopter can lift in a hover using 100% available power.

One aspect of the present invention relates to a visual indicator for use in an aircraft having a piston engine. The indicator provides a pilot with a display of actual power available from the engine based on current flight conditions. The indicator receives inputs from a temperature gauge and an altitude sensor. A processing resource associated with the indicator uses current altitude and temperature readings to determine ambient air pressure currently available to the piston engine. The indicator displays the maximum engine manifold pressure available to the pilot. In a preferred embodiment, the indicator displays maximum continuous power and five-minute maximum power levels for the aircraft based on the actual maximum power available.

Another aspect of the indicator of the present invention is a display that shows a pilot a percentage of actual power available from the piston engine. The indicator receives a manifold pressure signal from a manifold pressure gauge attached to a manifold of an engine of the aircraft. The processing resource associated with the indicator determines a ratio of the manifold pressure of the engine to the currently available maximum five-minute MP limit or to the maximum available MP, whichever is most limiting, and displays the ratio to the pilot. This can be displayed as a percentage of power in use.

Another feature of the visual indicator of the present invention is a display that shows a pilot the maximum weight that can be carried in hover (both "in ground effect" and "out of ground effect" conditions). A processor or the like determines hover weight carrying capability by storing the aircraft's empty weight and subtracting from that the weight of fuel on board. Fuel weight is calculated by inputting the quantity of fuel on board (FOB) (in gallons) from a fuel computer and multiplying this quantity by the unit weight (5.7 pounds per US gallon of aviation gasoline). The hover weight value can then be expressed as gross, net (gross weight minus empty weight of the aircraft) or payload (net weight minus the weight of fuel aboard). Displaying payload weight is the most informative to the pilot as that represents the weight that can be carried in the cabin (e.g. passengers, baggage and the pilot) and reflects current flight conditions as fuel is burned off during operation.

Another aspect of the present invention is a system for displaying engine power available to a pilot of an aircraft having a piston engine. The system in one embodiment includes a communication bus for transferring information between components attached to the bus, specifically for communication between a control unit and a display unit. The system further includes an air temperature input coupled to an outside air temperature sensor for receiving an electric signal representative of the air temperature outside the aircraft. The system includes an altitude input coupled to an altitude sensor for receiving an electric signal representative of the altitude of the aircraft. Also included is a processing resource and memory. The processing resource receives the electric air temperature signal and the electric altitude signal and in conjunction with an algorithm stored in memory, or as part of its basic functions, calculates the ambient air pressure available for use by the aircraft's piston engine.

Additional aspects, features and advantages of this invention will be apparent from the following detailed description of preferred embodiments thereof, which proceeds with reference to the accompanying drawings.

BRIEF DESCRIPTION OF THE DRAWINGS

FIG. 4 is a software flowchart of the operation of the system of FIG. 1.

DETAILED DESCRIPTION OF PREFERRED EMBODIMENTS

Figure 1:
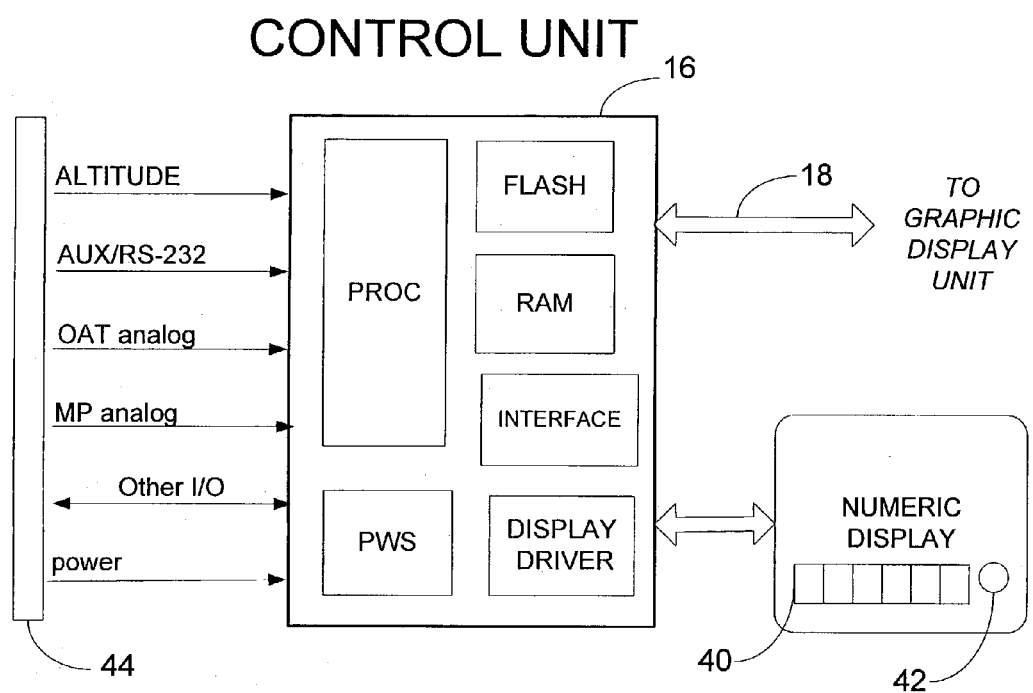
FIG. 1 is a simplified electronics block diagram of an instrument and display system in accordance with one embodiment of the present invention.
Figure 2A:
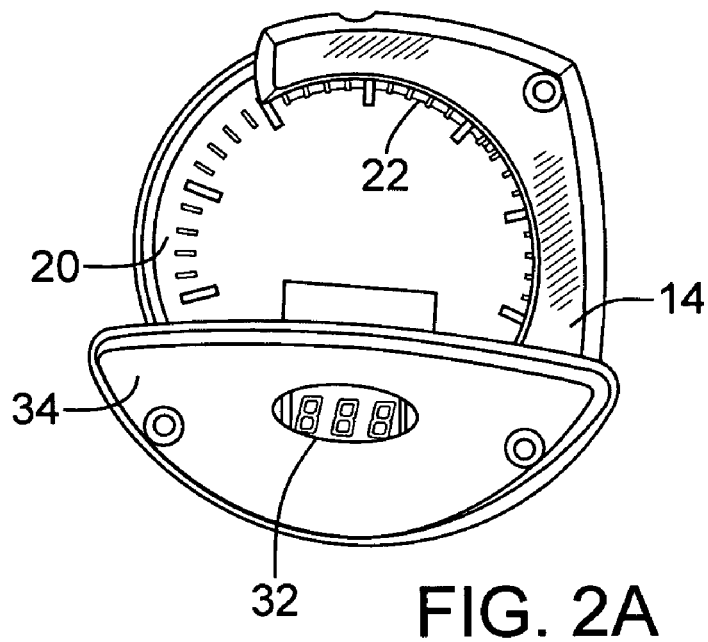
FIG. 2A illustrates a power available and limitation indicator (power display unit) of the system of FIG. 1 mounted overlying a standard manifold pressure gauge on an aircraft's instrument panel.
Figure 2B:
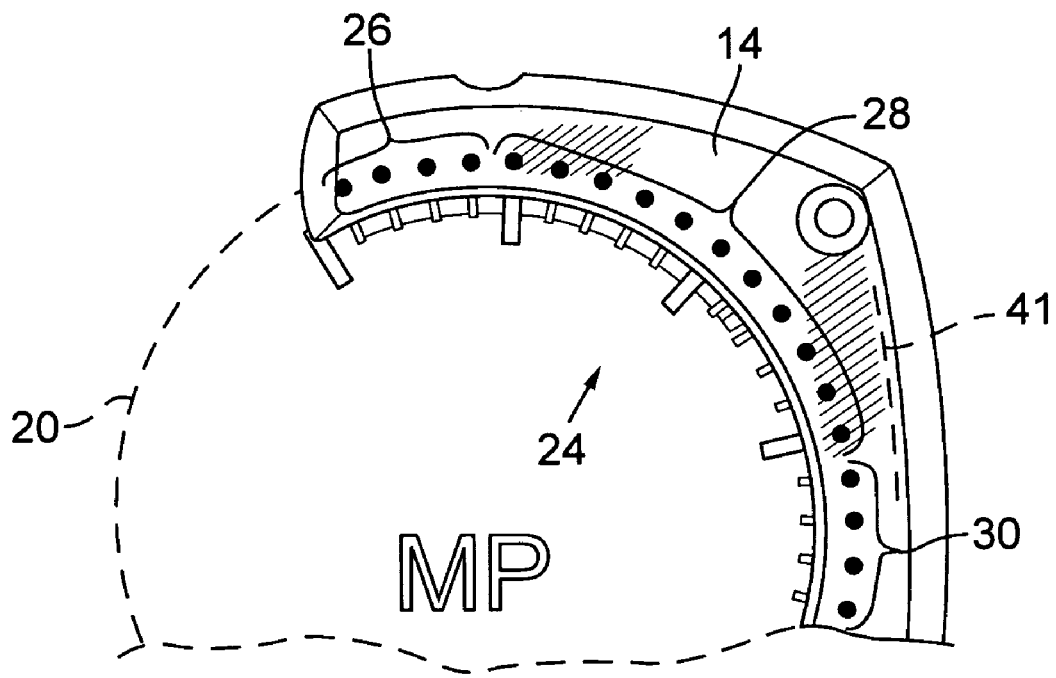
FIG. 2B shows details of the LED array of the power display unit of FIG. 2A.

FIG. 1 is a block diagram of a system in accordance with the present invention. With reference to FIG. 1, the two major components in a presently preferred implementation are a power display unit 14 (FIG. 2) and a control unit 16. These two system components are linked together using a bus 18, which in a currently preferred embodiment is an I2C bus.

FIG. 2 shows an implementation of the power display unit 14 of the present invention. With reference to FIG. 2, power display 14 is mounted partially overlying a manifold pressure (MP) gauge 20, so that manifold pressure gauge 20 and any power indicators thereon, such as painted arc 22, remain partially visible. Power display 14 includes a set of light emitting diodes (LEDs) 24 mounted in an arc so that each LED corresponds to a value on adjacent manifold pressure gauge 20. In a preferred embodiment LEDs 24 are spaced apart such that adjacent LEDs 24 represent a difference of 0.5 inches of mercury of manifold pressure (MP). In addition, LEDs 24 include a subset of green LEDs 26 capable of producing green light, a subset of green/yellow LEDs 28 capable of producing either green light or yellow light, and a subset of yellow LEDs 30 capable of producing yellow light. In a presently preferred embodiment, the group of green LEDs 26 includes five green LEDs, the group of green/yellow LEDs 28 includes twelve green/yellow LEDs, and the group of yellow LEDs 30 includes four yellow LEDs.

Power display 14 illuminates selected LEDs of the set of LEDs 24 in green color to indicate that continuous operation is allowed at corresponding values on MP gauge 20. (i.e., no limitation on operation). Power display 14 illuminates selected LEDs of the set of LEDs 24 in yellow color to indicate that operation is limited to take off power (five minutes) at corresponding values on MP gauge 20. The power display 14 turns off selected LEDs to indicate that engine operation is not permitted at or above a value on MP gauge 20 corresponding to the un-illuminated LEDs of the set of LEDs 24 or that engine power cannot be produced at this MP (i.e. it visually indicates a maximum or 'red line' value for MP).

In one embodiment, the LED control logic (preferably implemented in software, as described later), can be described by the following formula, for a given LED, viz:

Formula 1:

=IF(OR(I12>Avail_MP,I12>max_5_min+0.25),″ ″,
    IF(I12>=max_cont+0.25,″YEL″,″GREEN″))

Formula 1 is actually a single logical function. This function was used during development in a spreadsheet application to simulate the software, so it reflects the familiar Microsoft® Excel® spreadsheet function format. The "IF" function takes three arguments, delimited by commas: a logical test, a value if true, and a value if false. In Formula 1, the false value is itself a nested IF function in which the true and false values "YEL" and "GREEN," respectively, result in illuminating the corresponding light elements. Formula 1 cell reference "I12" refers to the MP reading for first LED, 17.0 in the example described.

Referring again to FIG. 2A, power display 14 further includes a percent power display 32. Percent power display 32 can be implemented, for example, using a three-digit or four-digit numeric display connected via bus 18 to the control unit 16. Preferably, percent power display 32 uses green LED 5×7 dot matrix segments to form the three-digit numeric display. An engine MP value is digitized and read by the control unit 16. Control unit 16 then uses the digitized MP value to calculate and display engine power (MP) used as a ratio of the current MP in use and the maximum engine power available in a numeric pilot presentation on percent power display 32. For example, if percent power display 32 shows "98%" then it is indicating to a pilot that essentially all available power, adjusted for altitude, temperature and aircraft limitations, is presently being used. Percent power display 32 helps keep a pilot apprised of how much additional power is available at current conditions.

Referring once again to FIG. 2B, power display 14 includes a display circuit board having approximately twenty LEDs 24 surface mounted on a circuit board (not shown), which is then enclosed in a thin plastic package (not shown). Power display 14 can then be mounted above a helicopter's existing 2.5″ diameter mechanical Manifold Pressure gauge 20.

Each LED must be bright enough to be readable in a sunlit cockpit, and is automatically dimmed when photocell 34 detects an ambient light level in the cockpit that is below a predetermined threshold value, so as to be unobtrusive at night. Likewise, percent power display 32 must be bright enough to be readable in a sunlit cockpit, and is automatically dimmed when photocell 34 detects an ambient light level in the cockpit that is below a predetermined threshold value, so as to be unobtrusive at night. Preferably, all LEDs are covered by a 20–26% transmittance neutral gray plastic filter with anti-glare coating on the front surface (not shown).

The power display unit can also include two warning or status lights 34, which preferably are colored yellow and red. The yellow warning light is illuminated whenever the MP is within the five-minute limit. When engine MP has remained in the five-minute limit operating region for more than a predetermined time period, say 4 minutes since engine start, the yellow light blinks slowly. When the MP has remained in the five-minute limit for five or more minutes, the yellow light blinks rapidly. The red warning light preferably is illuminated when engine power is at or above 100% of available power. Above another predetermined value, say 102%, the red light blinks rapidly to let the pilot know they are exceeding the maximum power limitation, and power should be immediately reduced.

In a preferred embodiment, the system of the present invention is designed to be small and easy to install. Power display unit 14 includes a low profile circuit board 41 and is interconnected to control unit 16 via a small four-wire flexible cable.

Figure 5:
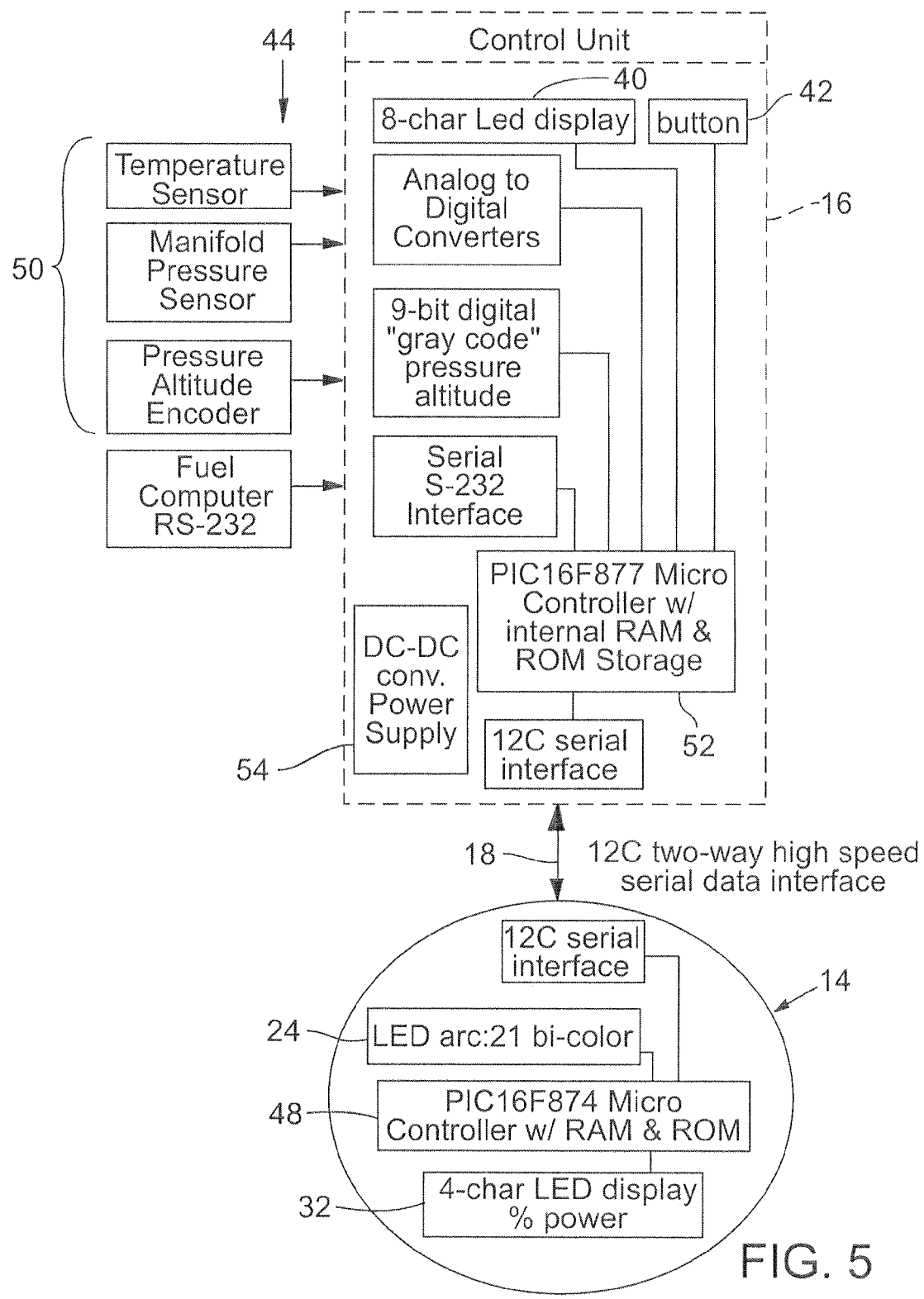
FIG. 5 is a more detailed schematic diagram of one implementation of the system of the present invention.

Referring now to FIG. 5, power display 14, in a currently preferred embodiment, includes a PIC16F87X family microprocessor 48, manufactured by Microchip Technology Inc. of Tempe Ariz. (not shown). However, the only functions of the PIC microprocessor are to operate LEDs 24, percent power display 32 and communicate via bus 18 with control unit 16. All performance calculations are preferably performed in control unit 16.

Figure 3A:
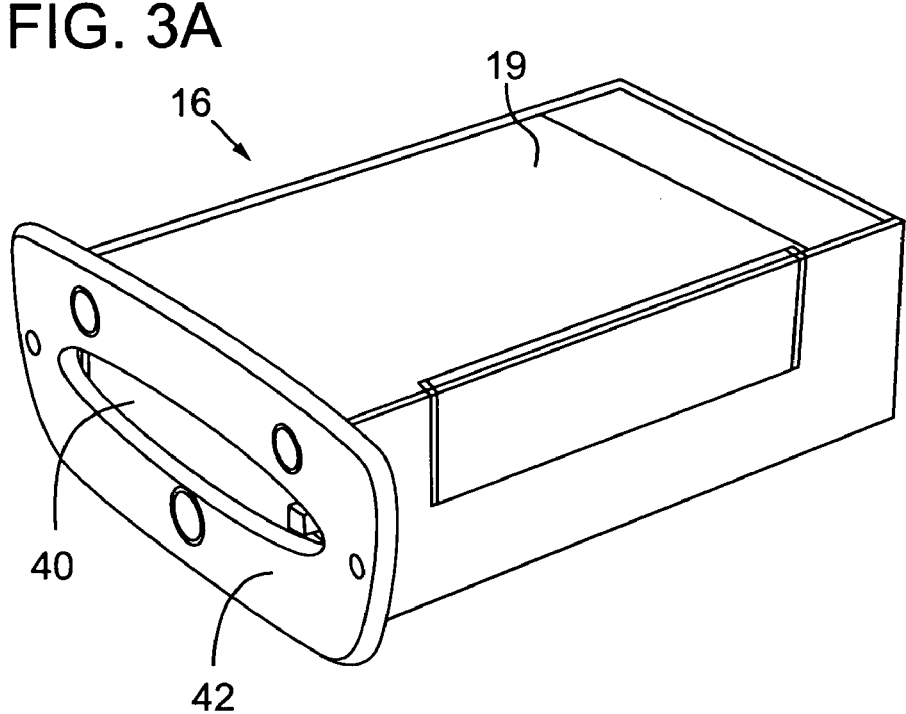
FIG. 3A is an exterior perspective view of the control unit of FIG. 1 configured for use in place of a standard outside air temperature gauge on an aircraft instrument panel.
Figure 3B:
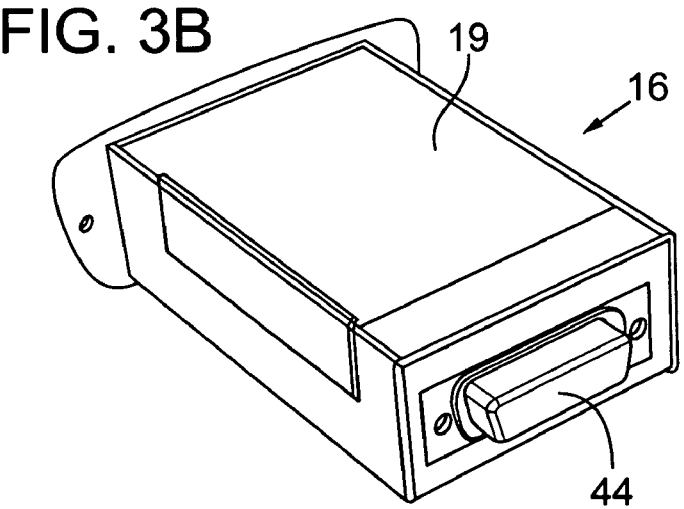
FIG. 3B is a rear perspective view of the control unit of FIG. 3A.

FIGS. 3A and 3B show front and rear perspective views, respectively, of control unit 16 in a presently preferred commercial implementation. With reference to FIGS. 3A and 3B, control unit 16 is preferably mounted in a small aluminum enclosure 19 that approximately matches the dimensions of an existing Davtron digital air temperature gauge (not shown) that is standard equipment in all RHC model R22/R44 helicopters (approx. 1⅞″ wide, 3″ deep and 1″ high). In this way, existing air temperature probe and instrument panel mounting points (not shown) can be reused by replacing the Davtron with control unit 16. Since the R22/R44 type certificate requires an approved a TSO-C43c temperature display, control unit 16 should be certified to FAA TSO (technical standards orders) C43c as is the original Davtron temperature unit.

Control unit 16 can also be used to show various input or calculated values in digital fashion on an eight character alphanumeric display 40 mounted in the control unit 16. Eight-character alphanumeric display 40 is preferably composed of green LED segments for digital readout of selected values. Control unit 16 further includes a selection or mode button 42 to allow a user to control the unit, such as cycling through available display modes, showing various values, as discussed below in the context of one commercial embodiment.

The power display unit 14 can also use the "limitations arc" 24 of colored LEDs to show the pilot the current manifold pressure value. To do this, the individual LED that corresponds to the current measured MP value is turned off, creating a distinctive "notch" in the limitation arc. Displaying the MP value on the arc itself also helps to minimize any visual errors due to parallax that might cause the MP instrument's pointer to not appear to line up properly with the LED arc.

FIG. 5 is a block diagram showing that control unit 16 accepts inputs from the altitude, temperature and MP sensors 50 and contains an internal microprocessor 52, for example the single-chip PIC16F87X family manufactured by Microchip Technology Inc. of Tempe, Ariz. with integral analog and digital interfaces (not shown) and FLASH read-only memory. In this embodiment, all calculations are performed by the single-chip microprocessor in control unit 16. In this embodiment, control unit 16 is interconnected with power display 14 via a four wire flexible cable implementing a serial data interface such as the I²C serial bus.

Control unit 16 also contains an aircraft grade DC power supply 54, and an external connector 44, which in a currently preferred embodiment is a 26-pin HDB male connector. The values that can be displayed by control unit 16 on alphanumeric display 40 include the following:

Air temperature in degrees Celsius, Fahrenheit, and ±ISA
Density altitude
Manifold pressure
Hover in ground effect (HIGE) maximum weight (gross, payload or useful)
Hover out of ground effect (HOGE) maximum weight (gross, payload or useful)
$V_{NE}$ (never exceed speed)
Maximum continuous power limit
"Stopwatch" timer
Flight Timer (e.g., time since engine was started)

Performance data (such as HIGE, HOGE and power limits) are typically derived from tables in a FAA approved rotorcraft flight manual for the piston-powered helicopter in which it is desired to use the present invention.

Typically, pressure altitude is input in digital ('gray code') or serial (RS232) format from a standard altitude encoder, as would normally be provided to a transponder with a TSO C88a altitude encoder. Gray code altitude uses nine digital inputs and can encode altitudes up to 30,700 feet. In either format the altitude is encoded into an electric signal that can be transmitted from the altitude encoder to control unit 16.

Outside air temperature (OAT) is normally input in an analog format using a standard aircraft temperature sensor. A presently preferred embodiment employs for a temperature sensor a thermister (resistor which varies with temperature) with nominal resistance of 10,000 ohms at 25 degrees C. Temperature measurement is calibrated accurate to 1° C. with software programmed correction tables internal to control unit 16. The temperature sensor produces an electric signal representing the outside air temperature that can be transmitted to control unit 16 where that signal is converted to a digital value and corrected using software programmed correction tables to a temperature in degrees Centigrade.

Manifold pressure, which is used to compute percentage of available power, is normally in analog format and is provided by a solid state absolute pressure sensor such as the Motorola MPXA4100AS. Typically, the MP sensor is mounted on a small 0.5"×0.75" circuit board and has a 0.25" ID "stove pipe" connection for plastic tube which attaches to the existing MP gauge (United Instruments model 6111) via a "tee" fitting. The MP sensor's analog signal will be transmitted to control unit 16 for use in calculating percentage of available power as discussed above.

Fuel quantity on board is sent by an existing fuel computer (such as the JP Instruments FS-450 or Shadin FADC-200) as a digital signal in serial RS-232 format to control unit 16. The control unit reads the fuel load and converts the number of gallons aboard into pounds of weight.

The unit operates on aircraft power (10–36 volts DC) supplied from either a new or existing circuit breaker. Its power supply should meet RTCA DO160D Section 16 specifications for noise immunity, power spikes, 300 ms supply interruption, etc.

Available engine power is determined by a combination of linear interpolation from stored tables that that can be determined by empirical testing and mathematical models of physical properties of the atmosphere (such as the approximation that available pressure decreases 1" per 1,000 feet of pressure altitude change). For example, the following table shows the percentage of power available, as determined by empirical testing, for the Lycoming O-540 engine used in the R44 helicopter at various altitudes.

TABLE

Percentage Power Available-Lycoming O-540 Engine.

| O-540 HP at alt | |
|---|---|
| 0 | 100.0% |
| 1,000 | 96.8% |
| 2,000 | 93.6% |
| 2,500 | 92.0% |
| 3,000 | 90.5% |
| 4,000 | 87.5% |
| 5,000 | 84.6% |
| 6,000 | 81.7% |
| 7,000 | 78.9% |
| 8,000 | 76.2% |
| 9,000 | 73.5% |
| 10,000 | 70.8% |
| 11,000 | 68.3% |
| 12,000 | 65.8% |
| 13,000 | 63.4% |
| 14,000 | 61.0% |
| 15,000 | 58.7% |
| 16,000 | 56.5% |

FIG. 4 is a software flow chart showing the steps that are repeated every 0.5 seconds to read inputs values, calculate necessary variables, and send values to both the graphic display unit 14 and control unit 15 8-character display. In the embodiment pf FIG. 4, available power "AVAIL MP" is calculated at step 10, and compared to various predetermined power limits in steps 11-6.

A Commercial Embodiment

Several aspects of the invention are further described below in the context of a commercial embodiment called the "PALi" (for "Performance Available and Limitations Indicator"), a helicopter performance calculator and display system developed by the present inventor. It accepts altitude, air temperature, fuel on-board and engine manifold pressure inputs, as explained above, and calculates (in substantially real time) the following: (1) maximum amount of power the engine can produce at these conditions; (2) limitations set by the aircraft manufacturer on power that may be used; (3) maximum airspeed and hover weight allowed under these conditions; (4) percent power used (the "torque gauge"); and (5) amount of power remaining (the "green/yellow power arc"). These values are displayed both graphically (with a color "power arc") and numerically (on four- and eight-character alphanumeric displays) for the pilot to easily see and interpret.

1. What is PALi?

PALi is a precision instrument designed to keep you focused outside the helicopter by minimizing or eliminating the need for manual performance calculations, and gives you critical performance information such as percent power at a glance. PALi is a two-piece instrument consisting of the Power Display Unit and the Control Unit. The Power Display FIG. 2A contains an LED arc of 20-green/yellow miniature LEDs that overlay the existing colored instrument arc of the manifold pressure gauge. Located in the lower half of the gauge is a four-character "percent power" display. Above the four-character display are two warning lights, one yellow and one red. The entire power display unit preferably installs on top of the manifold pressure gauge.

The second piece, the Control Unit FIG. 3A, contains an eight-character alphanumeric LED display and a push button to select the value to be displayed. It installs in the instrument sub-panel and normally replaces the standard OAT gauge.

2. Features

PALi simplifies helicopter operation by automatically calculating a variety of performance data and limitations, and by measuring temperature, altitude, manifold pressure and fuel quantity on board. Items that can be displayed include:

2.1 Temperature

Outside air temperature (OAT) is shown in degrees Celsius and Fahrenheit.

2.2 Performance Data and Limitations

Percent power

Density altitude

Hover in-ground effect maximum weight (gross or payload)

Hover out-of-ground effect maximum weight (gross or payload)

Maximum continuous power and maximum takeoff power limits $V_{NE}$ 2.3 Fuel-on-Board Weight Weight of fuel on board ("FOB") is determined by reading the "quantity remaining" from a JPI or Shadin fuel computer and converting that into pounds. (In order for the FOB weight display and the hover weight limits displayed as "payload" to be correct, the pilot must ensure that the fuel computer is properly initialized and set to accurately reflect the amount of fuel on board.)

2.4 Timers

The PALi Control Unit also includes two precision count-up timers: one for "elapsed time" and another to automatically track "flight time," i.e., elapsed time since engine start. These timing functions allow the helicopter to be operated without needing a separate clock/timer, thus saving precious instrument panel space:

A. Flight Timer (time since engine start).

B. Elapsed Timer (for timing instrument procedures, cool down, etc.).

Press and hold (for two seconds) the button while in Elapsed Timer display to reset the timer, and continue counting.

The Elapsed Timer continues to count up even when other functions are shown on the display.

Note: there is no way to "stop" the timer, only a way to reset it to zero as described above.

2.5 Performance Data is Derived from POH

Performance data (such as HIGE, HOGE and power limits) is derived from tables in the FAA approved rotorcraft flight manual for each helicopter model the PALi supports. Values in between charted entries are extrapolated via linear interpolation. (Extrapolated values that fall outside of the ranges provided by the manufacturer are shown as "----" (rather than giving a specific value) to indicate that no approved data is available for this combination of temperature, altitude, weight, etc.)

2.6 Percent Power

Other aircraft devices that claim to display "percent engine power" are simply manifold pressure (MP) referenced against a single static "red line" 100% value. Unique to the PALi's display is that it uses a dynamic 100% point calculated in real time to represent maximum usable power within present engine, altitude, temperature and aircraft limitations.

PALi not only provides % numbers based on the dynamically calculated manufacturer limitations, but also on the calculation of maximum available MP (the point at which an increase in collective pitch would cause the rotor rpm to decrease).

Percent Power is very similar to the "percent torque" gauge found in turbine-powered helicopters. The PALi thus makes flying a piston-powered helicopter more familiar to those pilots that normally fly turbine machines, and assists in training pilots of piston helicopters to prepare for flying turbine machines.

Clearly, where power is available in excess of the limits, there is no problem (except not to exceed the limitation). Safety problems occur where power available is less than the allowed limitation and the pilot is caught by surprise.

3. Displays and Controls 3.1 The Power Display: Limitations Arc

It consists of twenty LEDs in an arc around the Manifold Pressure Gauge. These LEDs correspond to MP positions of 17.0" through 26.5" and make a colored limitations arc that depicts the "maximum continuous" limit in green, and the "5-minute take-off maximum" in yellow. LEDs are illuminated "green" if the corresponding MP value is within available MP, and less than the manufacturer's five-minute MP limit. LEDs are illuminated "yellow" if their corresponding MP value is within available MP, and within the manufacturer's five-minute MP limit but under the maximum MP ("red line"). As the engine manifold pressure rises, LEDs that correspond to power "already used" are not lit. Thus, the LED arc shows power available to use.

Note: if Available Power is less than the five-minute maximum (which frequently occurs when the density altitude is above 5,000 feet), there will be no yellow LEDs in the arc. This indicates there is no time limit on engine operation because 100% power is reached before the engine can produce enough horsepower to be in the manufacturer's five-minute limitation area (i.e., throttle is wide open at 100%).

3.2 Power Display: Four-Character 5×7 Dot Matrix LED Display

It displays percent power (e.g., "85%"). Percent power is calculated as MP divided by the greater of five-minute MP limit or available MP. It displays MCP (maximum continuous power limit), e.g., "23.5" or "FULL." Before the engine has started, the Power Display shows the MCP limit for current conditions of altitude and temperature. When the altitude and temperature do not allow the engine to develop full power (e.g., at high-density altitudes), the helicopter POH table simply says the limit is "full throttle" or "wide open throttle." In this case, the four-character display will show WOT rather than a number. It displays a 30-second count down timer. After engine shutdown, it displays a count-down timer from 30 seconds to indicate when it is safe to apply the rotor brake. If a fault occurs in either unit (Control or Display), all LEDs in the arc are extinguished, and the numeric display changes to "----" until valid data is sent.

3.3 Power Display: Warning Lights

The yellow warning light is illuminated whenever the MP is within the five-minute limit. When engine MP has remained in the five-minute limit for more than 4 minutes since engine start, the yellow light blinks slowly. When the MP has remained in the five-minute limit for five or more minutes, the yellow light blinks rapidly. The red warning light is illuminated when engine power is at or above 100%. Above 102% the red light blinks rapidly to let the pilot know they are exceeding the maximum power limitation, and power should be immediately reduced.

3.4 Control Unit: Initial Power on, Self-Test and Integrity Monitoring

Upon power up, the Control Unit displays its firmware revision number (e.g., "PALi R01") and conducts a self test. Upon power up, the Power Display Unit initially lights all Green Arc LEDs, the Yellow warning light and shows "PALi" for one second; then lights all Yellow Arc LEDs, the Red warning light and shows the software revision (e.g., "R01") for one second. Once the self test is completed, the Control Unit enters "Before Start" operating mode (see Section 5) and shows outside air temperature. From here the pilot can cycle through the other displays by simply pushing the button. Once initial tests are completed, the Power Display Unit arc shows the power limitation.

Integrity Monitoring. Upon initial power up, and once every second, the Control Unit performs a "self-test." This constantly checks for valid inputs and proper operation of the software. The following items are checked: (a) tests that Altitude Encoder input is valid (note: altitude encoders are normally powered by the transponder itself, so if this test fails, ensure that the transponder is powered on ("STBY" or "ALT"); (b) tests that Temperature input is valid; (c) tests that MP input is valid; and (d) tests that Fuel Computer input (if part of your installation) is valid.

If self-test fails, then the Power Display Unit LED arc remains off, the Power Display Unit four-character displays shows "----" ("flagged"), and the Control Unit's eight-character alphanumeric display shows one of the following failure codes:

"BAD ALT!"—bad or no altitude encoder input
"BAD TMP!"—bad sensor or invalid temperature input
"BAD MP!"—bad sensor or invalid manifold pressure input
"BAD FOB!"—bad data format or connection to Fuel computer
Note: if a test fails and the error condition is subsequently cleared (e.g., the transponder is powered on, sensor reconnected, etc.), then the PALi will automatically begin normal operation within two seconds.

4. Automatic Operation Modes

There are three modes of operation: Before Start, Flight, and Shutdown. In each of these modes the PALi is programmed to automatically provide the pilot the most crucial and helpful information for that mode of operation.

4.1 Before Start Mode

When the PALi is first powered on, it enters Before Start mode. The operating mode automatically advances to Flight when the engine starts. In Before Start mode, the PALi Power Display Unit shows the maximum continuous power MP limitation as determined from the POH at current temperature and pressure. (The number displayed represents a limit MP that the checklist directs the pilot to determine before beginning flight.) Note that if the performance chart in the POH is in the "full throttle" area, the PALi display reads WOT for wide open throttle. The Display Arc shows all lights are extinguished. The Control Unit shows outside air temperature ("OAT"). The pilot can cycle through other displays as described in this guide by pressing the button.

4.2 Flight Mode

Once the engine has started, and until it is shut down, PALi is in Flight mode. While in Flight mode, the PALi Power Display Unit shows % power available. The Display Arc shows power remaining by illuminating corresponding lights at and above the current MP up to the maximum power available or maximum five-minute take off limit. Power within the continuous limit is shown with green LEDs, and power within the five-minute limit is shown with yellow LEDs. Operating the Control Unit is very simple and intuitive and can show various items. Refer to Section 6 for details.

4.3 Shutdown Mode

Once the engine has shut down, PALi advances to Shutdown mode. After 35 seconds, PALi automatically resets to Before Start mode. In Shutdown mode, the PALi Power Display Unit shows a 30-second countdown timer so the pilot knows when it is safe to apply the rotor brake. The Display Arc is blank. The Control Unit shows the Flight Timer (hours and tenths since engine start).

5. Control Unit Button (see 42 in FIG. 1) Operation

Operating the Control Unit is very simple and intuitive. The following table shows all possible displays and indicates what each press of the button does:

| Press | Value Shown | Description |
|---|---|---|
| ↓ | 30° C./86° F. | Air temperature in ° C./° F. |
| ↓ | DA 8,571 | Density altitude |
| ↓ | OGE$^L_B$2201 | Hover OGE in gross weight, or payload if the Fuel Computer is installed |
| ↓ | IGE$^L_B$732$^P_L$ | Hover IGE in gross weight, or payload if a Fuel Computer is installed |
| ↓ | MCNT 22.6 | Maximum continuous power limit |
| ↓ | VNE 117 | Never exceed limit |
| ↓ | FLT 1 + 33 | Timer #1: flight time |
| ↓ | 00:05:17 | Timer #2: count up (HOLD to reset to 0:0:0) |

Pressing the button after the last value is shown cycles the display back to the first value.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An instrument for use with an aircraft having a piston engine, an outside air temperature sensor for detecting an outside ambient air temperature, a manifold pressure sensor operatively coupled to a manifold of the engine for sensing a manifold pressure of the engine, and an altitude sensor for detecting an altitude of the aircraft, the indicator comprising:

an outside air temperature input for receiving an electric air temperature signal representing the ambient air temperature outside the aircraft from the outside air temperature sensor;

an altitude input for receiving an electric altitude signal representing the altitude of the aircraft from the altitude sensor;

a processing resource including memory, wherein engine performance data, including engine power limits, is stored in the memory;

an available pressure algorithm executable by the processing resource and stored in the memory, the available pressure algorithm operable to calculate available ambient air pressure based on the received electric air temperature signal, and the received electric altitude signal; and an indicator for displaying engine power available based on the calculated available ambient air pressure and the stored engine power limits.

2. An instrument according to claim 1 wherein the indicator is a set of lights mounted adjacent to a manifold pressure gauge.

3. An instrument according to claim 2 wherein each light comprises a light emitting diode.

4. An instrument according to claim 2 further comprising a photo sensor coupled to the processing resource and operable to sense light in the aircraft, and the processing resource is operable to adjust a brightness of the set of lights based on the photo sensor detecting light in the aircraft.

5. An instrument according to claim 1 further comprising
a manifold pressure input for receiving an electric manifold pressure signal representing the manifold pressure of the engine from the manifold pressure sensor; and
a percent power indicator for indicating the percent of available power as a ratio of the manifold pressure to the available ambient air pressure.

6. An instrument according to claim 5 wherein the percent power indicator comprises a digital display.

7. A system for determining the power available to a piston aircraft engine in an aircraft having an outside air temperature sensor for monitoring an outside ambient air temperature, a manifold pressure sensor operatively coupled to a manifold of a piston engine for monitoring a manifold pressure of the engine, and an altitude sensor for monitoring an altitude of the aircraft, the system comprising:

a bus for transferring electric signals between the control unit and graphic display unit;

a control unit with internal processing resource, storage device and eight character alphanumeric display coupled to the bus;

a graphic display unit coupled to the bus with LED arc and four-character alphanumeric displays;

an altitude input coupled to the control unit for transferring an electric altitude signal representing the altitude of the aircraft from the altitude sensor to the processing resource;

an outside air temperature input coupled to the control unit for transferring an electric air temperature signal representing the ambient air temperature outside the aircraft from the outside air temperature sensor to the processing resource; and an available power algorithm stored in the control unit's storage device and, in conjunction with the processing resource, operable to calculate available power based on the altitude of the aircraft, the outside air temperature, and predetermined operating parameters provided by the aircraft manufacturer.

8. A system according to claim 7 wherein the display comprises a series of lights.

9. A system according to claim 7 further comprising engine information including a power limit stored in the storage and wherein the available power algorithm is further operable to determine if available power exceeds the engine power limit and to calculate the available power to be the engine power limit when the available power exceeds the engine power limit.

10. A system according to claim 7 further comprising:
an engine manifold pressure input coupled to the control unit for transferring an electric altitude signal representing the engine power (manifold pressure) from the altitude sensor to the processing resource;
a percent power algorithm stored in the memory and operable to calculate the percent of available power being used as the ratio of the manifold pressure of the engine to a calculated power available value; and
a percent power indicator coupled to the bus for receiving a calculated percent power available value from the processing resource and displaying said percent power available value.

11. An indicator for determining the power available to a piston aircraft engine in an aircraft having an outside air temperature sensor for monitoring an outside ambient air temperature, a manifold pressure sensor operatively coupled to a manifold of a piston engine for monitoring a manifold pressure of the engine, and an altitude sensor for monitoring an altitude of the aircraft, the indicator comprising:

means for receiving an electric air temperature signal representing an ambient air temperature outside the aircraft;

means for receiving an electric altitude signal representing an altitude of the aircraft;

means for calculating an available power of the piston engine based on the received electric air temperature signal and the received electric altitude signal;

means for displaying the calculated available power;

means for storing engine information including a predetermined power limit;

means for comparing the predetermined power limit to the calculated available power; and means for displaying the lesser of the calculated available power and the predetermined power limit.

12. A method of presenting engine power available at current altitude to a pilot for consideration in the operation of a piston engine aircraft, the aircraft having an instrument panel and an MP manifold pressure instrument mounted in the panel, and the method comprising the following steps:

determining an available ambient air pressure as a function of present altitude of the aircraft;

comparing the determined available ambient air pressure to predetermined engine power limits to determine a current engine power available;

and displaying to the pilot of the aircraft a graphical indication of the current engine power available.

13. A method according to claim 12 wherein said displaying step includes displaying the graphical indication of the actual power available in close proximity to an instrument tat indicates a detected manifold pressure MP.

14. A method according to claim 12 wherein said displaying step includes positioning and aligning the graphical indication of the actual power available relative to the ME instrument so as to facilitate a qualitative visual comparison of the indicated MP to the graphical indication of the actual engine power available.

15. A method according to claim 12 wherein said displaying step includes providing an array of light elements, each light element corresponding to a predetermined MP value, and dynamically forming the graphical indication of the actual power available by selectively activating one or more of the array of light elements.

16. A method according to claim 12 wherein said array of light elements comprises a generally linear array.

17. A method according to claim 12 wherein said array of light elements comprises a generally arcuate array.

18. A method according to claim 17 wherein the arcuate array of light elements is sized and ranged for mounting on the aircraft instrument panel extending along a peripheral portion of the faceplate of an ME instrument mounted in the panel, such that each of the light elements substantially juxtaposes a respective location on the faceplate of the instrument corresponding to the actual engine power available graphically indicated by activation of the said light element.

19. A method according to claim 17 wherein the array of light elements includes a plurality of different colors of light elements; and said displaying step includes
    activating at least one element of a firs; color to form a graphical indication of MP levels within which continuous operation of the said piston engine is permitted; and
    activating at least one light element of a second color to form a graphical indication of MP levels within which 5-minute operation of the said piston engine is permitted in accordance with predetermined manufacturer specifications.

20. A method according to claim 19 wherein the light elements comprise LEDs.

21. A method according to claim 19 wherein the light elements comprise an EL display panel.

22. A power display unit for use in a piston-driven helicopter comprising:
    a series of light elements spaced apart in a substantially arcuate configuration, mountable in the helicopter for observation by a pilot, each light element corresponding to a predetermined manifold pressure; wherein
    the light elements are capable of controllably emitting first and second predetermined colors, the first color indicating currently available power up to a maximum continuous power level, and the second color indicating additional power available, if any, within the aircraft manufacturer's five-minute take-off maximum power level limit but under a predetermined maximum manifold pressure "red line".

23. A power display unit according to claim 22 wherein the series of light elements substantially conforms to a predetermined radius of curvature of a manifold pressure gauge and the series of light elements are located so that, when the power display is installed in the helicopter partially overlaying an existing colored instrument arc of the manifold pressure gauge, each of the light elements is positioned juxtaposing a corresponding value on the manifold pressure gauge.

24. A power display unit according to claim 22 wherein the first color is green, and a selected contiguous subset of the light elements are activated to emit green light thereby forming an illuminated green arc visually corresponding to a manifold pressure range up to a current maximum continuous power level.

25. A power display unit according to claim 22 wherein the second color is yellow, and a selected contiguous subset of the light elements are activated to emit yellow light thereby forming an illuminated yellow arc visually corresponding to a manifold pressure range up to a current 5-minute take-off maximum power level.

26. A power display unit according to claim 22 wherein the light elements are approximately 20 in number and comprise LEDs.

27. A power display unit according to claim 22 wherein the power display unit further comprises a display that indicates a current percentage of actual power available, calculated as MP divided by the greater of five-minute MP limit or available MP.

28. A power display unit according to claim 27 and further comprising at least one warning light for so indicating whenever the MP is within the five-minute MP limit.

\* \* \* \* \*